United States Patent [19]
Watanabe

[11] Patent Number: 6,124,959
[45] Date of Patent: Sep. 26, 2000

[54] OPTICAL WAVELENGTH-DIVISION MULTIPLEXING TRANSMISSION SYSTEM

[75] Inventor: Seiji Watanabe, Tokyo, Japan

[73] Assignee: NEC Corporation, Tokyo, Japan

[21] Appl. No.: 08/721,230

[22] Filed: Sep. 26, 1996

[30] Foreign Application Priority Data

Sep. 27, 1995 [JP] Japan ..................................... 7-249890

[51] Int. Cl.[7] ..................................................... G02B 6/00
[52] U.S. Cl. .......................... 359/179; 359/174; 359/333; 359/339
[58] Field of Search ................................... 359/124, 161, 359/179, 339, 333–349

[56] References Cited

U.S. PATENT DOCUMENTS

| | | | |
|---|---|---|---|
| 5,060,301 | 10/1991 | Nishimura | 359/179 |
| 5,083,874 | 1/1992 | Aida et al. | 359/174 |
| 5,260,823 | 11/1993 | Payne et al. | 359/241 |
| 5,283,686 | 2/1994 | Huber | 359/337 |
| 5,446,812 | 8/1995 | Hirst | 385/24 |
| 5,471,334 | 11/1995 | Masuda et al. | 359/177 |
| 5,504,609 | 4/1996 | Alexander et al. | 359/125 |
| 5,579,420 | 11/1996 | Fukushima | 385/11 |
| 5,861,980 | 1/1999 | Ono | 359/341 |

FOREIGN PATENT DOCUMENTS

| | | | |
|---|---|---|---|
| 63-132205 | 6/1988 | Japan . | |
| 4-269726 | 9/1992 | Japan . | |
| 5-37472 | 2/1993 | Japan . | |
| 537472 | 2/1993 | Japan . | |
| 5-224252 | 9/1993 | Japan . | |
| 5-244102 | 9/1993 | Japan . | |
| 2257320 | 1/1993 | United Kingdom | 359/125 |
| 2279838 | 1/1995 | United Kingdom . | |
| WO9118434 | 11/1991 | WIPO . | |

OTHER PUBLICATIONS

English Translation of Japanese Patent Office Action for Japanese Patent Application 7–249890 dated Sep. 24, 1997.
English Translation of Japanese patent Office Action for Japanese Patent Application 7–249890 dated Dec. 15, 1998.
J. Aspell, et al, "Erbium Doped Fiber Amplifiers for Future Undersea Transmission Systems," 8352 IEEE LCS, The Magazine of Lightwave Communication Systems 1 (1990) Nov., No. 4, pp. 63–66.
IEEE Photonics Technology Letters, Ebrium–Doped Fiber Amplifier with Flattened Gain Spectrum, Tachibana et al., Feb. 1991.
Electronic Letters, Ebrium doped fibre amplifier with dynamic gain flatness for WDM, Nilsson et al., Aug. 1995.

*Primary Examiner*—Edward Lefkowitz
*Attorney, Agent, or Firm*—Sughrue, Mion, Zinn, Macpeak & Seas, PLLC

[57] ABSTRACT

An optical wavelength-division multiplexing transmission system includes an optical wavelength-division multiplexing transmitter, an optical wavelength-division multiplexing receiver, and a plurality of optical amplifiers disposed on an optical transmission line connecting the transmitter and receiver. Optical filters are disposed on said optical transmission line for flattening the pass band gain characteristics of a predetermined number of optical amplifiers. It is desirable that one optical filter is disposed for every one to thirty amplifiers. The optical wavelength-division multiplexing transmission system of the present invention can thus flatten accumulated gain characteristics of the amplifiers so that several different wavelengths can be transmitted without attenuation.

19 Claims, 4 Drawing Sheets

6,124,959

OPTICAL WAVELENGTH-DIVISION MULTIPLEXING TRANSMISSION SYSTEM

BACKGROUND OF THE INVENTION

The present invention relates to an optical wavelength-division multiplexing transmission system, and, more particularly, to technology for solving problems caused from gain characteristics of an optical amplifier.

Recently, in an optical transmission system, use of an optical amplifier/repeater, and wavelength-division multiplexing of optical signals have been investigated to meet demand for longer distance transmission in higher capacity.

In a conventional long distance wavelength-division multiplexing optical transmission system, a number of direct optical amplifiers are disposed between an optical transmitter and an optical receiver. However, the direct optical amplifier exhibits slightly different gain characteristics for each wavelength used. Accordingly, when a number of direct optical amplifiers are disposed, the gain characteristics of each direct optical amplifier are accumulated. Thus, there arises significant difference between the gain characteristics for each wavelength, and the characteristic curve of the direct optical amplifier becomes sharper, so that the pass band (for example, 3 dB) is narrowed down, and optical signals are significantly attenuated outside the bandwidth.

Japanese Patent Application Laid-Open No. 5-37472 discloses a configuration of an optical transmission system which solves this problem. With such a configuration, first, multiplexed optical signals output from an optical amplifier are divided into each wavelength by an optical divider. Then, an optical attenuator attenuates light in each wavelength so that optical signals with higher gain are matched to those with lower gain. The attenuated light is again multiplexed and output by an optical coupler 7.

However, with the above configuration, since the attenuator accommodating to specific wavelength is provided, the wavelength is fixed, and the arrangement of device is complicated. Moreover, since optical signals with other wavelengths are attenuated to match those with lowest gain, there arises a problem that loss is increased as a whole. Therefore, the configuration of FIG. 4 is difficult to be applied to an optical transmission system over a long distance.

SUMMARY OF THE INVENTION

The present invention is intended to provide an optical wavelength-division multiplexing transmission system which solves such problem, and which can repeat and transmit optical signals over a wide range without attenuating them.

To attain the above object, the optical wavelength-division multiplexing transmission system according to the present invention comprises an optical wavelength-division multiplexing transmitter for multiplexing and transmitting optical signals with a plurality of wavelengths, an optical wavelength-division multiplexing receiver for receiving the wavelength-division multiplexed optical signals, and a plurality of optical amplifiers disposed on an optical transmission line which connects said transmitter and said receiver. In addition, the present invention further comprises optical filters for flattening pass band gain characteristics of predetermined number of optical amplifiers on the optical transmission line.

The optical filter may be disposed in an optical repeater solely or in combination with the optical amplifier. One optical filter is desirable to be disposed for every ten to thirty optical amplifiers.

The optical filter transmits a plurality of signal light with different wavelengths without attenuation by flattening the gain characteristics of direct optical amplifiers which differ for each wavelength.

BRIEF DESCRIPTION OF THE DRAWINGS

The above and other objects, features and advantages of the present invention will become more apparent by reference to the following detailed description when taken with the accompanying drawings, in which.

DETAILED DESCRIPTION OF THE PREFERRED EMBODIMENTS

Figure 1:
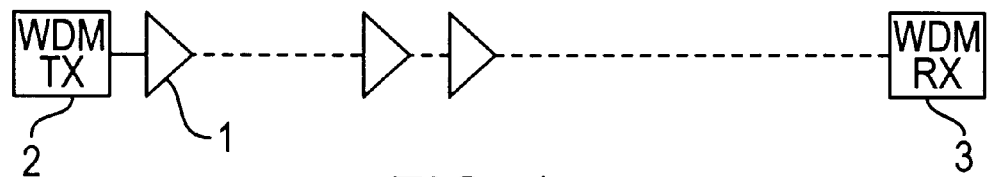
FIG. 1 is a block diagram of a basic configuration of conventional optical wavelength-division multiplexing transmission system.

First, a conventional optical wavelength-division multiplexing transmission system is described with reference to the drawings. FIG. 1 shows the basic configuration of the 25 system. A number of direct optical amplifiers 1 are disposed between an optical transmitter 2 and an optical receiver 3. The direct optical amplifier 1 is typically disposed in an optical repeater.

Figure 2A:
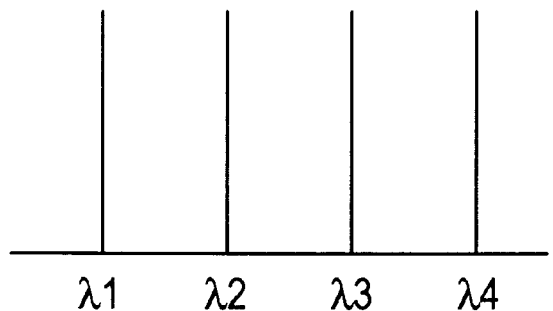
FIGS. 2A and 2B are a diagram showing signal light to be wavelength-divided multiplexed, and diagrams showing gain characteristics of a plurality of optical amplifiers for each wavelength.
Figure 2B:
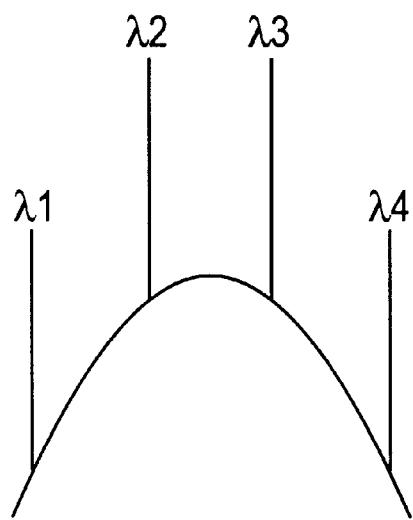

Now, it is assumed in the optical wavelength-division multiplexing transmission system of FIG. 1 that signal light with four different wavelength $\lambda 1$, $\lambda 2$, $\lambda 3$, and $\lambda 4$ is wavelength-division multiplexed and transmitted as, for example, shown in FIG. 2A. In this case, since gain characteristics of the optical amplifier slightly differ for each wavelength, when the signal light passes through a plurality of optical amplifiers, the gain characteristics of signal light at each wavelength would significantly differ as shown in FIG. 2B.

Figure 3:
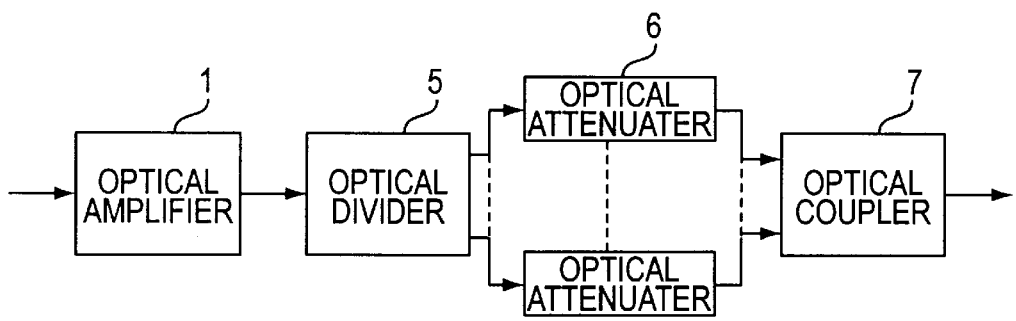
FIG. 3 is a block diagram showing a configuration of well known optical amplifier.

The optical amplifier of FIG. 3 is proposed to solve the above problem. Multiplexed light signal is output from the optical amplifier 1, divided into each wavelength by the divider 5, and attenuated by an attenuator. The attenuator attenuates signal light with higher gain to match signal light with lower gain. Thus, entire optical wavelength-division multiplexed signals suffer from large loss.

Figure 4:
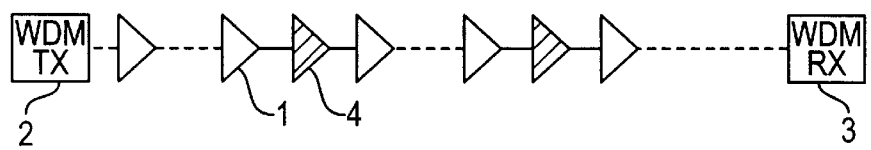
FIG. 4 is a block diagram showing a basic configuration of the present invention.

FIG. 4 schematically shows the configuration of the present invention. A number of optical amplifiers 1 are disposed on an optical transmission line between an optical transmitter 2 and an optical receiver 3, and optical filters 4 are disposed for every predetermined number of the optical amplifiers.

Figure 5A:
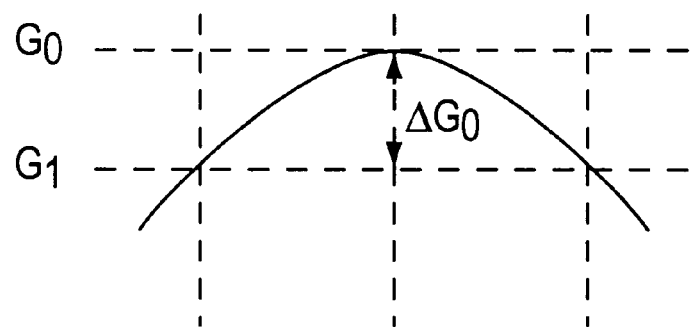
FIGS. 5A through 5C show gain characteristics when accumulated by a plurality of optical amplifiers, a diagram showing gain characteristics of an optical filter of the present invention, and a diagram showing flattened gain characteristics, respectively.

Here, there is shown a case of wavelength-division multiplexing using four wavelengths where wavelength λ1 is 1556 nm, λ2 is 1557 nm, λ3 is 1558 nm, and λ4 is 1559 nm. Er doped fiber optics amplifiers as the optical amplifiers are disposed with interval of about 30 km to 100 km, and fiber optics wavelength selection filters as the optical filters are disposed for every 20 optical amplifiers. FIG. 5A shows accumulated gain characteristics for signal light at each wavelength when 20 optical amplifiers are connected. When a pass band with the center wavelength of 1557.5 nm and width of 5 nm is assumed, difference of about 1 dB is caused in the gain in this pass band as in FIG. 5A.

Figure 5B:
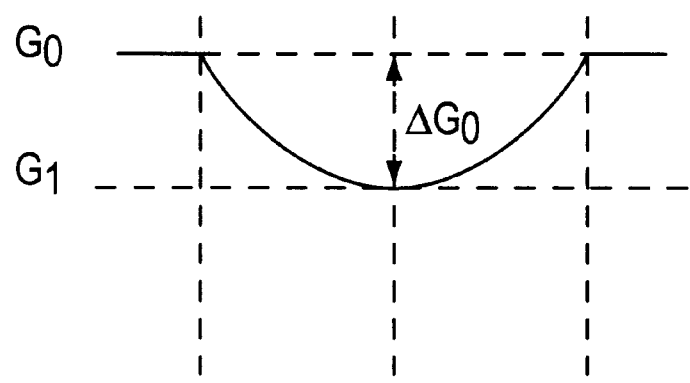
Figure 5C:

As the optical filter to compensate such gain characteristics, ones with characteristics as in FIG. 5B are disposed for every 20 optical amplifiers. As shown in FIG. 5B, at boundary areas of a pass band region, the filter of the present invention has a larger gain G0 than at a central area of the G1. Thus, the pass band of the filter is curved in nature, with a minimum gain at a substantial center of the pass band. Consequently, the gain characteristics are flattened in this pass band as shown in FIG. 5C.

Figure 7:
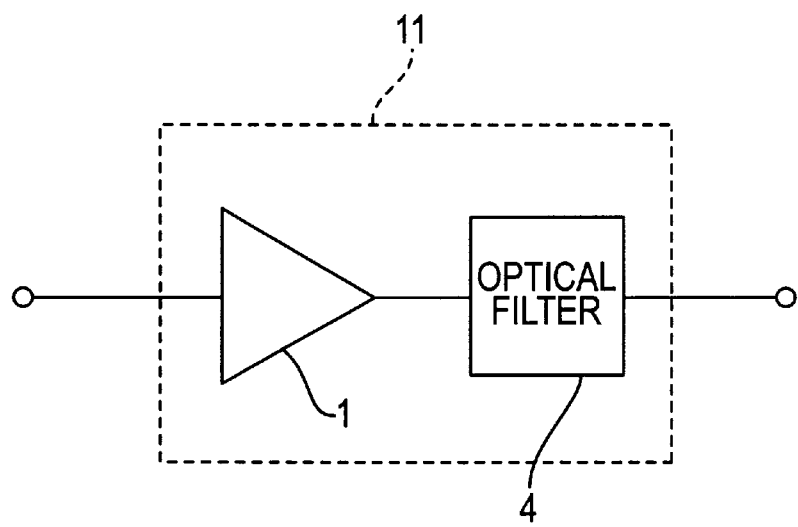
FIG. 7 is a diagram showing a basic configuration of optical repeater which is provided with an optical amplifier and an optical filter for flattening pass band gain characteristics of the optical amplifier.
Figure 8:
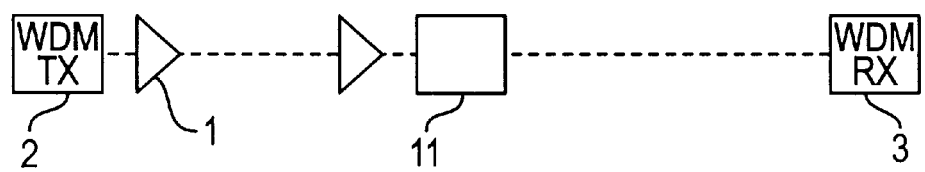
FIG. 8 is a block diagram showing an optical wavelength-division multiplexing transmission system disposed with the optical repeater shown in FIG. 7.

The optical filter may be disposed independently, or within the optical amplifier, or at the output or input end thereof. The optical amplifier is disposed in the optical repeater. In this case, the optical repeater 11 with the optical amplifier 1 and the optical filter 4 having characteristics corresponding to the gain characteristics of the predetermined number of optical amplifiers may be configured as shown in FIG. 7. As shown in FIG. 8, the optical repeater 11 is disposed between the optical transmitter 2 and the optical receiver 3 with a predetermined interval.

The optical filter is desirably disposed for every 1 to 30 optical amplifiers. If the number of the optical amplifiers exceeds 30, it becomes difficult to configure an optical filter to compensate them. Even if an optical filter is configured, matching is made for wavelength with low gain so that loss is increased, which is not desirable.

Figure 6:
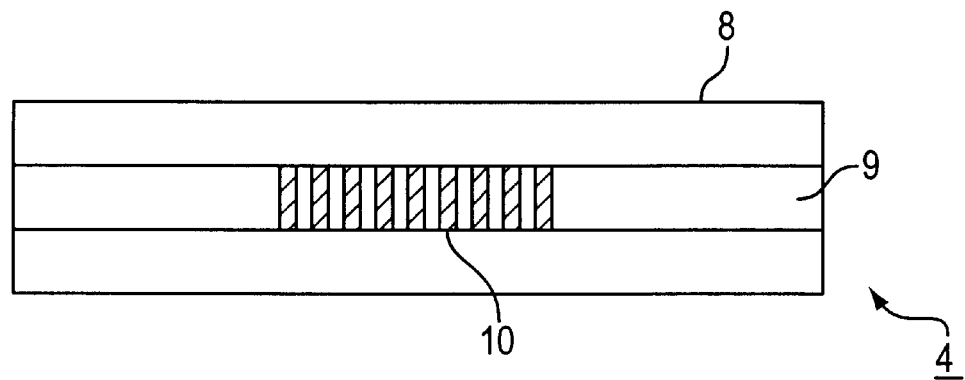
FIG. 6 is a sectional view showing an example of configuration of fiber optics wavelength selection filter.

The optical filter can be configured with a conventional optical filter. In the embodiment, a fiber optics wavelength selection filter (fiber Bragg grating) is employed. This filter is, as shown in FIG. 6, a fiber optics reflection filter in which a Bragg grating 10 is formed in a fiber core 9 of the optical filter 8, and can be easily configured for characteristics with bandwidth (FWHM) from 0.1 nm to about 20 nm up to the center wave length of about 1600 nm. The filter can easily form the Bragg grating in the fiber optics 8 by irradiating ultraviolet in a direction perpendicular to the longitudinal direction of the fiber optics 8 through a phase mask formed with a grating to cyclically change the optical characteristics (for example, refractive index) of parts of the core 9 of the fiber optics 8. Alternatively, a grating can be formed in the core by projecting beams interfering each other from each end of the fiber optics.

Other optical filters which can be utilized include a multilayered dielectric film optical interference filter, and optical filters using a diffraction grating or etaron.

The optical amplifier used is an Er doped fiber optics amplifier. This performs direct optical amplification for Er doped fiber optics with high gain for induced emission in the 1.55 micron band with 1.48 micron excitation light from an InGaAsP semiconductor laser or the like. Other amplifiers include a semiconductor optical amplifier which excites a semiconductor laser by injecting carriers to excite signal light.

The optical signal transmitter 2 basically comprises a plurality of optical transmission sections for transmitting light signals with different wavelength, and an optical coupler. The optical signal receiver 3 comprises an optical divider and a plurality of light receiving sections corresponding light with different wavelengths.

The optical coupler and the optical divider may be those using a multilayered dielectric film optical interference filter, a diffraction grating or fiber optics described above.

As described, as the optical filters for flattening the pass band gain characteristics of optical amplifiers are disposed in an optical wavelength-division multiplexing transmission system in which the optical amplifiers are disposed between an optical signal transmitter and an optical signal receiver, it is possible, according to the present invention, to flatten the accumulated gain characteristics of the optical amplifiers so that the optical signals can be repeated and transmitted over a wide range without attenuating the signals. In particular, a plurality of optical signals with different wavelengths can be transmitted without attenuation in the optical wavelength-division multiplexing transmission system.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical wavelength-division multiplexing transmission system comprising an optical wavelength-division multiplexing transmitter, an optical wavelength-division multiplexing receiver, a plurality of optical amplifiers disposed on an optical transmission line and an optical filter disposed on said optical transmission line for flattening pass band gain characteristics of said optical amplifiers, wherein said optical filter is disposed for every predetermined number of optical amplifiers.

2. An optical wavelength-division multiplexing transmission system as set forth in claim 1, wherein one optical filter is disposed for every 1 to 30 optical amplifiers.

3. An optical wavelength-division multiplexing transmission system as set forth in claim 1, wherein the optical filter is a fiber optic wavelength selection filter or a multilayered dielectric film optical interference filter.

4. An optical wavelength-division multiplexing transmission system as set forth in claim 1, wherein the optical amplifier is an Er doped fiber optics amplifier.

5. The optical wavelength-division multiplexing transmission system as set forth in claim 1, wherein said optical filter has a convex-shaped pass band characteristic, wherein a first gain characteristic corresponding to a first wavelength limit and a second wavelength limit of the pass band of the optical filter is higher than a second gain characteristic at an interior portion of the pass band.

6. The optical wavelength-division multiplexing transmission system as set forth in claim 5, wherein said second gain characteristic reaches a minimum at a substantial center of the pass band.

7. The optical wavelength-division multiplexing transmission system as set forth in claim 6, wherein the filter comprises a multilayered dielectric film optical interference filter.

8. The transmission system of claim 1 wherein said optical filter is located at one of an output end and an input end of said predetermined number of optical amplifiers, and said predetermined number of optical amplifiers comprises a plurality of optical amplifiers.

9. The transmission system of claim 8 including a plurality of optical filters, wherein one of said plurality of optical filters is disposed for said predetermined number of optical amplifiers.

10. An optical repeater comprising an optical amplifier, and an optical filter for flattening pass band gain characteristics of a predetermined number of optical amplifiers, wherein said predetermined number of optical amplifiers is more than one.

11. An optical wavelength-division multiplexing transmission system comprising an optical wavelength-division multiplexing transmitter, an optical wavelength-division multiplexing receiver, and a plurality of optical amplifiers disposed on an optical transmission line connecting them, wherein parts of the plurality of optical amplifiers are the optical repeater set forth in claim 10.

12. The optical repeater according to claim 10, wherein said optical filter has a convex-shaped pass band characteristic, wherein a first gain characteristic corresponding to a first wavelength limit and a second wavelength limit of the pass band of the optical filter is higher than a second gain characteristic at an interior portion of the pass band.

13. The optical repeater of claim 12, wherein wherein said second gain characteristic reaches a minimum at a substantial center of the pass band.

14. The optical repeater of claim 13, wherein the filter comprises a multilayered dielectric film optical interference filter.

15. The optical repeater of claim 10, wherein said optical filter flattens the pass band gain characteristics of a plurality of optical amplifiers.

16. The optical repeater of claim 15, wherein said optical filter is located at one of an output end and an input end of said plurality of optical amplifiers.

17. An optical repeater comprising a plurality of optical amplifiers and an optical filter means for flattening pass band gain characteristics of a predetermined number of said optical amplifiers by providing a convex-shaped band pass characteristic, wherein said predetermined number of optical amplifiers is more than one.

18. The optical repeater of claim 17 wherein said optical filter means flattens the pass band gain characteristics of a plurality of said optical filters.

19. The optical repeater of claim 18, wherein said optical filter means is located at one of an output end and an input end of said plurality of optical amplifiers.

* * * * *

UNITED STATES PATENT AND TRADEMARK OFFICE
CERTIFICATE OF CORRECTION

PATENT NO. : 6,124,959
DATED : September 26, 2000
INVENTOR(S) : Seiji Watanabe

It is certified that error appears in the above-identified patent and that said Letters Patent is hereby corrected as shown below:

Column 1, line 42, delete "4" insert --3--.

Column 2, line 46, delete "25".

Column 4, line 61, delete "5" insert --8--;

line 65, delete "6" insert --9--.

Column 5, line 6, delete "8" insert --15--;

line 21, delete "10" insert --6--;

line 22, delete "10" insert --6--

Column 6, line 1 delete "12" inset --11--;

line 4, delete "13" insert --12--;

line 7, delete "10" insert --6--;

line 10, delete "15" insert --16--;

line 20, delete "17" insert --14--;

line 23, delete "18" insert --17--.

Signed and Sealed this

Twenty-second Day of May, 2001

*Attest:*

NICHOLAS P. GODICI

*Attesting Officer*    *Acting Director of the United States Patent and Trademark Office*